United States Patent [19]
Cozzolino

[11] 3,949,597
[45] Apr. 13, 1976

[54] GYROSCOPIC DEVICE FOR LOCATING THE GEODETIC POINT OF ROUTE

[76] Inventor: Luigi Antonio Cozzolino, Via Ciociaria 16/2, Rome, Italy

[22] Filed: Jan. 23, 1974

[21] Appl. No.: 435,996

[30] Foreign Application Priority Data
Feb. 6, 1973    Italy.................................. 48086/73

[52] U.S. Cl............................................. 73/178 R
[51] Int. Cl.²...................................... G01C 21/00
[58] Field of Search.......... 73/178 R, 178 H; 33/321

[56] References Cited
UNITED STATES PATENTS
| | | | |
|---|---|---|---|
| 3,050,995 | 8/1962 | Dozier............................ | 73/178 R |
| 3,163,039 | 12/1964 | Newman et al................. | 73/178 R |

FOREIGN PATENTS OR APPLICATIONS
| | | | |
|---|---|---|---|
| 762,346 | 11/1956 | United Kingdom............... | 73/178 R |

Primary Examiner—Donald O. Woodiel
Attorney, Agent, or Firm—Michael J. Striker

[57] ABSTRACT

A device for determining the longitudinal and latitudinal position of a carrier includes a gyroscopic system having a cage on which three pairs of masses are supported for rotation about mutually perpendicular axes. The cage is supported in a support with three degrees of freedom of movement so that, after the gyroscopic system is set into motion in a position in which one of the axes is parallel to the terrestrial axis, it will maintain its position in the celestial space, regardless of the rotation of the Earth and of the movement of the carrier with respect thereto, while the support follows such rotation and such movement. The change in the angular positions of the support with respect to the cage indicates the time elapsed and the change in position of the carrier, and the indication of the time elapsed can be eliminated either by calculation or by rotating an indicator in synchronism with the rotation of the Earth. A pendular system supports the gyroscopic system and indicates the position of the instantaneous vertical independently of the oscillatory movement of the carrier.

8 Claims, 5 Drawing Figures

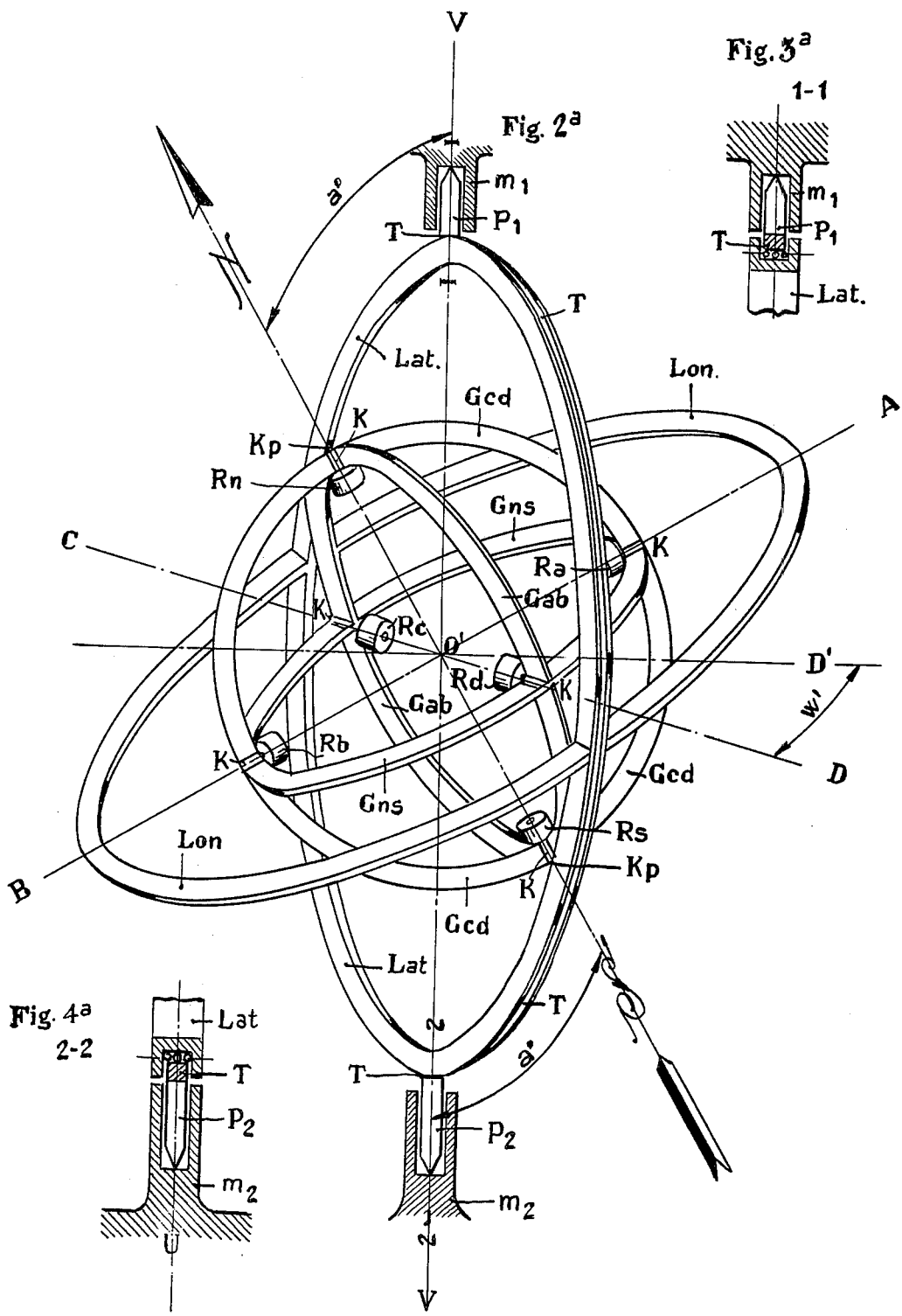

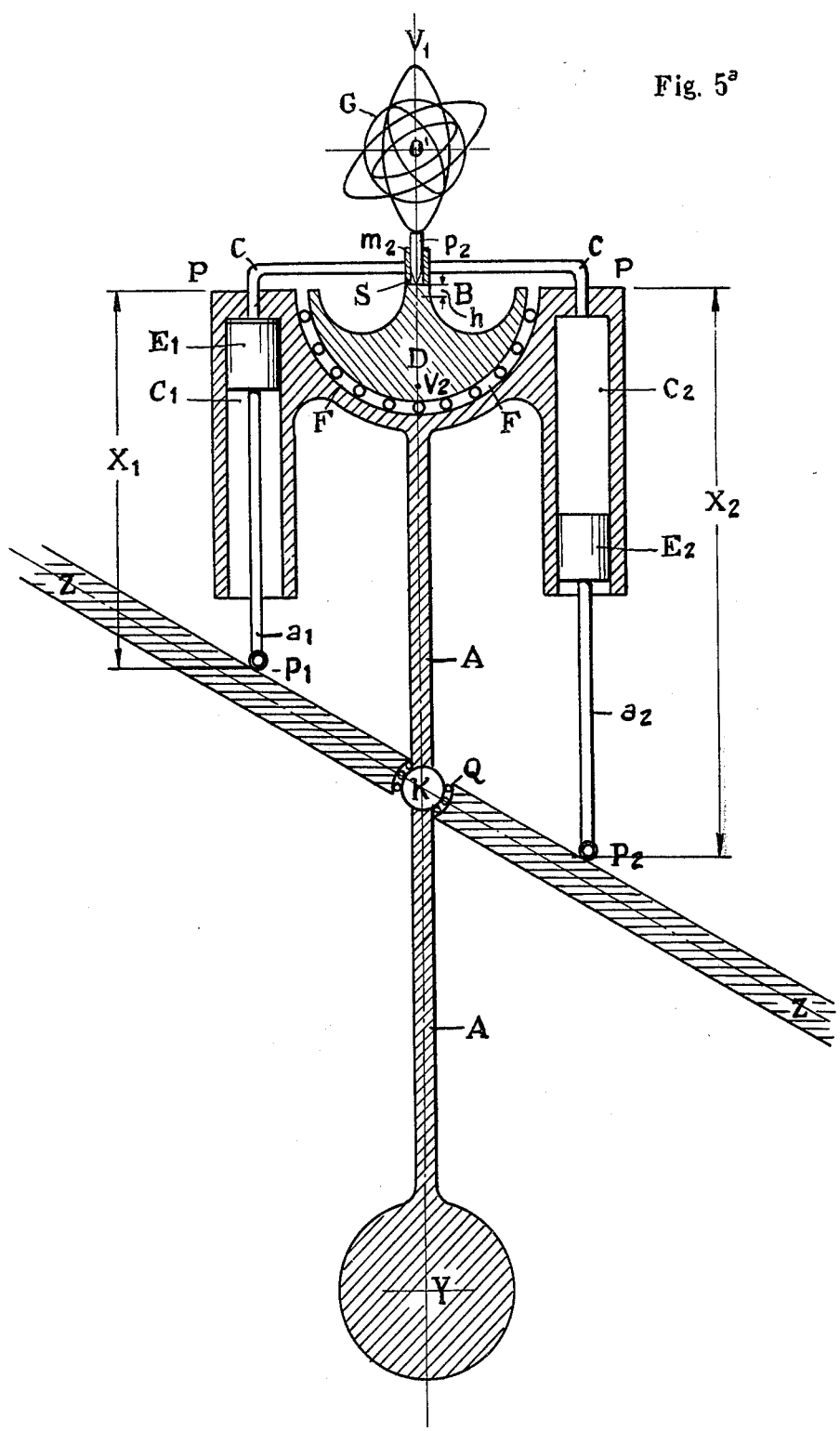
Fig. 5ᵃ

GYROSCOPIC DEVICE FOR LOCATING THE GEODETIC POINT OF ROUTE

BACKGROUND OF THE INVENTION

Until now it was not possible to locate with the required accuracy the point of route of a ship or of a submarine, when it was not possible to receive luminous or electromagnetic waves.

The present invention solves such a problem resorting to the inertial stability of a grysocopic system and to the direction of the vertical which is ascertained through the use of a pendulum as a consequence of the force of gravity.

About such a principle were made from time to time, and about everywhere, proposals, researches and also inventions. However, the different devices for the implementation of the principle seem not to be technically effective, chiefly to achieve the purpose of the requisite precision of the course bearing, and also as their performance is concerned and furthermore as the sturdiness of the structure of their different members and assemblies is concerned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a perspective view of a gyroscopic system according to another embodiment of the present invention;

FIG. 3 is a sectional view taken on line 1—1 of FIG. 2;

FIG. 4 is a sectional view taken on line 2—2 of FIG. 2; and

FIG. 5 is a sectional view of a pendular system of the present invention and illustrating the gyroscopic system of FIG. 2 in a diagrammatic manner.

DETAILED DISCUSSION OF THE PREFERRED EMBODIMENTS

Figure 1A:
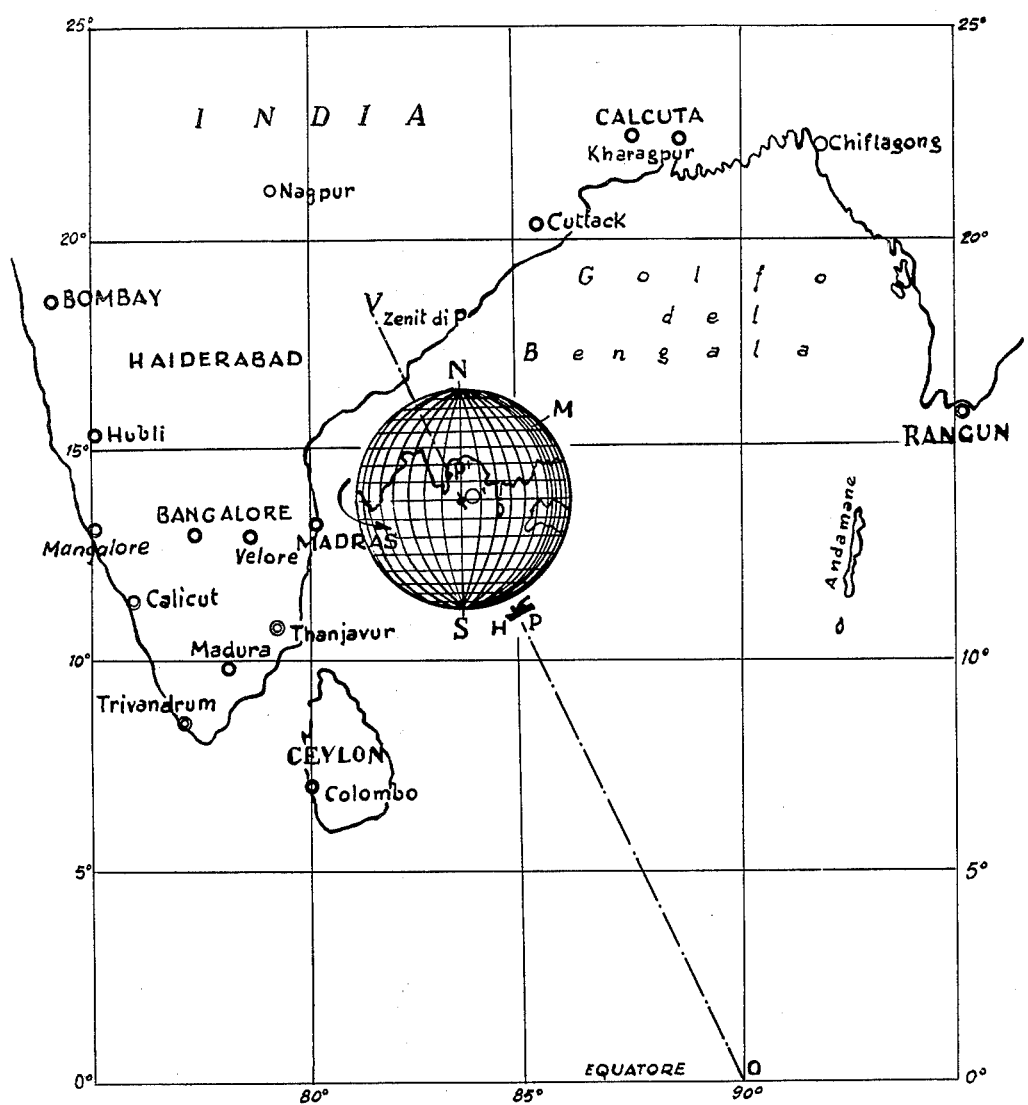
FIG. 1 is a diagrammatic view of a spherical chart of the Earth used in one embodiment of the present invention superimposed on a planar chart.

As diagrammatically shown in the FIG. 1 whatever will be the position of the carrying means (ship or submarine) H, the vertical VP, as ascertained in the same, for example from the axis of a pendulum having a suitable length, represents, even though only approximately as a consequence of the imperfect sphericity of the Earth, the direction of the geodetic ray PO, which connects the point P with the center O of the Earth.

It is evident that if the carrying means could be equipped with a spherical chart of the Earth M, that would be homothetic to the terrestrial geoid, and that ideally would be independent from the motion of rotation of the Earth, and having its own rotary motion in complete synchronism and in phase coincidence with the rotation of the Earth, the vertical VP that is assumed to be passing through the center O' of the already mentioned spherical chart of the Earth, would intersect the chart in the point P' which corresponds to the corresponding present geodetic point P of the said carrying means.

All what was said before was said only for the purpose of expressing clearly the idea of the already mentioned principle.

The currently preferred embodiment of the invention includes two complex assemblies:

the first of them is constituted by a gyroscopic system having three orthogonal axes and having the purpose and the function of establishing and maintaining the relative directions, in such a way that they remain fixed in the celestial space;

the second of them is constituted by a special pendular system which has the purpose and the function of indicating, with the required precision, the direction of the vertical along the route.

In the FIG. 2 there is shown diagrammatically and in a perspective view a gyroscopic system that is composed of three pairs of gyroscopes having the same mass and the same inertial moment, that rotate about three respective axes. The three axes are orthogonal one relative to the other two and they intersect in a central point O'. Furthermore, the three axes are initially prearranged in such a way that one of them, the axis NS, is parallel to the axis of the terrestrial rotation, whereas the other two axes, AB and CD, are parallel to two equatorial terrestrial rays that are perpendicular one to the other.

The techniques that are used for the practical construction of the gryoscopes and for their operation have undergone in the last years, noteworthy improvements; therefore, it would be useless, as well as practically very arduous to describe the gyroscopes and the devices needed for their setting in motion as well as for maintaining the motion, as conventional gyroscopes can be used in the present invention and operate in a known manner.

The present invention which relates to an original assembly of the various components, some of which are absolutely new, is novel whatever its shape or the arrangement of its components.

More specifically, the aforementioned gyroscopic system comprises six revolving masses Rn, Rs, Ra, Rb, Rc, Rd in the FIG. 2. All these masses have identical and symmetrical characteristics relatively to the center O', and they are arranged in pairs for rotation about the three orthogonal axes.

Such a structure is obtained through a carrying cage including three rings, preferably of circular shapes, the rings Gns, Gab, Gcd being concentric, having the same configuration and being welded in such a way that they lie in three respective planes orthogonal one to the other two and having only the common point O', and together form the carrying cage.

More particularly, the ring Gns must maintain its own plane in a position always parallel to the terrestrial equator, so that this ring will be hereafter called the equatorial ring.

The axis of rotation of each couple of the rotating masses is determined by the bearings K, which, in turn, are supported on the aforementioned carrying cage; preferably, they are arranged at the polar segments, in which the respective two rings intersect, the planes in which these rings are located, intersecting in the respective gyroscopic axes of rotation.

The aforementioned carrying cage is, in turn, supported on two polar bearings Kp, that are arranged at the opposite ends of an axis NS of a ring Lat, so that the carrying cage can freely rotate about the axis NS.

Finally, it is to be mentioned that all the masses that are supported on the ring Lat, must be arranged symmetrically relative to the center O' of the gyroscopic system, in such a way that their barycenter perfectly coincides with the center O' of the gyroscopic system.

It is also emphasized that the device, being based on the arrangement of three gyroscopes having stiff and orthogonal axes of rotation, has a noteworthy inertial stability, as the incidental motions of precession automatically counteract each other.

The aforedescribed gyroscopic system — that, furthermore, is supported or suspended in a suitable room of the carrying means in such a way as to have three degrees of freedom of rotation — will therefore, after the instant of the simultaneous setting in motion of its three gyroscopes, maintain its three axes in the directions that are parallel to the ones that were originally imparted to them, i.e. in invariable direction relative to the celestial sphere, whereas the Earth is rotating about the axis and whereas the carrying means is covering its own course.

It is now easy to imagine that a hollow spherical chart of the Earth, having a convenient scale and having its own center in O' (FIG. 2) may now be arranged and rotated in perfect synchronism and in phase with the rotation of the Earth about the axis NS of the gyroscopic system, that is steadily parallel to the terrestrial axis of rotation.

As already said and shown in the FIG. 1, the point p' on the surface of the spherical chart of the Earth M, that is the point in which the vertical of the axis VP which passes through its center O', intersects the surface of the spherical chart, would allow in each instant to fix, as its own homologous point, the geodetic location P of the carrying means H.

However, it is not necessary to provide the spherical chart and it is easier and more beneficial to rely on the easy and direct reading of the angles of rotation that are traversed, starting from their original positions, by two rings Lat; Lon, one of them being the one of the latitudes, the other of them being the one of the longitudes.

The already mentioned ring Lat of the latitudes is shown in FIG. 2 and it is shown there in perspective.

The ring Lat is surrounded by and concentric to a guide-ring T, within which the ring Lat can slide with a minimum of friction about the center O' in opposite directions and also with angular excursions of more than 360°.

Furthermore, the guide-ring T can freely rotate about the vertical axis VO' as it is provided, in its upper part, with a radial stud $p_1$, received in a sleeve $m_1$, this sleeve $m_1$ being coaxial with the vertical axis of suspension VO' of the gyroscopic system or, in its lower part, with a radial stud $p_2$, received in a sleeve $m_2$, this sleeve $m_2$ being integral with a horizontal support U of the gyroscopic system.

FIG. 3 shows a section I — I of the two concentric rings Lat and T and a view of the radial stud $p_1$ integral with the ring T and that can freely rotate in the sleeve $m_1$ in the illustrated upright position.

FIG. 4 shows a section 2—2 of the aforementioned rings Lat and T and a view of the radial stud $p_2$ integral with the ring T and that can freely rotate in the sleeve $m_2$ carried by the horizontal support U, in the illustrated upright position.

With the described support of suspension system there are granted the three degrees of freedom of rotation, which the gyroscopic system, as aforementioned, must have.

The ring of the latitudes Lat always comprises in its plane both the vertical axis VO' and the gyroscopic axis NS that is always parallel, as a consequence of the gyroscopic inertia, to the axis of the terrestrial rotation, and that is supported at the opposite ends of its extensions, on the bearings $K_p$, arranged in a diametrally spaced relation within the ring Lat. Therefore, the ring Lat being located in the plane of the actual meridian of the carrying means, the direct reading of the angle $a°$ that is enclosed by the two coplanar straight lines VO' and NS can be measured on the arc of the ring Lat or of the ring T, that is the arc that is indicated by the relative position of the sleeves $m_1$ or $m_2$, whichever is nearest to the bearing Kp, and of the bearing Kp, which allows the immediate reading of the actual latitude of the position of the carrying means.

In any case, it is also not difficult to directly read the latitude that is $90° - a°$.

However, as the vertical of the locus is not going exactly through the center of the Earth, with the exception of the poles and of the equator, a graduated scale of latitudes must be engraved, having in mind the well known corrective formulas allowing the transformation of the so-called "geographic" latitude in the corresponding "geocentric" latitude.

On the contrary, as for the here requested degree of exactitude, it is possible to neglect the consequences of the known phenomena of precession and of mutation of the terrestrial axis.

For the determination of the longitude, the device — as it is diagrammatically shown in FIG. 2 — comprises the ring Lon of the longitudes, that is welded to the ring Lat of the latitudes in such a way as to be concentric and orthogonal to the same, similarly to the orthogonality of the terrestrial equator relative to all and each meridian. Furthermore, the ring Lon, must be concentric and coplanar with the equatorial ring Gns of the cage of the gyroscopic system.

However, since the ring Gns is compelled by gyroscopic inertia to maintain unchanged its own position in the celestial space, absolutely independently from the position of the ring of the latitudes Lat which is coplanar with the actual meridian and is compelled to follow its variations in the space, these variations being a consequence of the terrestrial rotation, as well as of the longitudinal displacements of the carrying means, an angle $w'$ results between the ring Lon, and the equatorial ring Gns during the time $t'$ from their relative position in the instant of the setting of the gyroscopes in motion, this angle $w'$ being enclosed by the straight line O'D', that is located in the plane of the actual meridian and the straight line O'D, that is located in the plane of the meridian at the moment of setting in motion.

The variation of longitude, $D1'$ which is ascertained after the time $t'$ has elapsed, is exactly determined in minutes of sexagesimal degree, as a function of the angle $w'$ that is expressed in minutes of degree, and as a function of the time $t'$ expressed in minutes, from the equation $D1' = w' - 15.t'$, where the term $15.t'$ is the time that has passed from the instant of setting in motion expressed in minutes of sexagesimal degree.

A positive or negative value of $D1'$ will show that the carrying means has moved, in the time $t'$, respectively to the east or to the west, whereas a zero value or a value equal to 21600' or multiple of 21,600' will show that the carrying means has returned to the longitude at which the rotation of the gyroscopic system was started.

Of course, the read-out of the angles $a°$ or $(90-a)°$ for the latitudes and $w'$ for the longitudes, will be made in different usual ways using nonia, microscopes, etc., whereas the elapsed time can be measured by chronometers that are set to the sidereal day.

To this purpose, it is possible to use special chronometers that directly give the time expressed in minutes of sexagesimal degree, in such a way as to allow an immediate determination of the term $15.t'$ of the previously quoted equation. Therefore, the aforementioned chronometers must be such as to allow their zero-setting at the instant when the rotation of the gyroscopes is commenced.

Furthermore, a provision is made for the possibility that the read-out of the angles $a°$ or $(90-a)°$ and $w'$ is to be performed in rooms, as the fore-bridge, that are different and remote from the room in which the gyroscopic device is arranged; in this case in addtion to or instead of electromechanical and electronic means, it is possible to use for the same purpose luminous signals conveyed through, for instance, transparent fibers which utilize the phenomenon of total reflection.

It is also possible to directly read the actual longitude of the carrying means, whether on the ring of the longitudes Lon utilizing a pointer that slides synchronically with the rotation of the Earth and that is carried on a special ring arranged about the equatorial ring Gns of the gyroscopic cage; or on the equatorial ring Gns utilizing a different pointer that slides — in opposite direction to the Earth movement, but with the same speed — inside the ring Lon that will assume, in such a case, the function of a guide ring; or, finally, on a ring that slides, synchronically and in phase with the rotation of the Earth — outside the equatorial ring Gns relative to a pointer that is carried by the ring of the latitudes Lat, in such a case the ring Lon being omitted.

In the three here stated possibilities of rotation of the already mentioned mobile components (pointers or rings) it would be possible to use any kind of clock-device of any already known type that must be set into motion simultaneously with starting the gyroscopic system.

The until now described device requires, of course, the determination of the position of a vertical axis, which may be ascertained in different ways.

However, it is proposed to ascertain such position with the requested accuracy by merely resorting to a pendular system of the so-called compound type (i.e. analogous to the metronome of Mälzel), that has an oscillation period sufficiently, advantageously several times, greater than the period of oscillation of the carrying means which is caused by the wave motion, by the wind, by the vibrations, etc.

Of course, the axis $V_1V_2$ of such a pendulum must include, as diagrammatically shown in FIG. 5 the axis $O'V$ of the gyroscopic system G with its three axes as afore described and shown in FIG. 2 and only diagrammatically in FIG. 5.

The gyroscopic system G must retain its three degrees of freedom so that it is connected to the axis $V_1V_2$ by the sleeve $m_2$ that was already shown in the FIGS. 2 and 4.

Furthermore, a weight D must be arranged symmetrically relative to the oscillation center S of the pendular system and downwardly thereof. The weight D has a mass of the same order as the gyroscopic system G, so that the barycenter B of the whole compound pendular system is spaced a required small distance h from the oscillation center S.

Finally, the moment of inertia I of the whole compound pendular system and its mass M must be sufficiently large so that the oscillation period T has the required value (for example an hour), as determined from the equation $$T = 2\pi \sqrt{\frac{I}{M.g.h}},$$

in which $g$ is the acceleration of gravity.

In FIG. 5 the pendular system, already described, is illustrated as being partially enclosed and carried in its lower part in a hollow spherical guard F, on the inner surface of which it can slide with a minimum of friction in all directions and the geometrical center of which is its own oscillation center S.

Of course, if the spherical guard F were stiffly connected to the structure of the carrying means, it would follow all the movements of the carrying means and therefore all these movements would be transmitted to the compound pendular system, having its center of oscillation in S.

But such transmission of movements caused by friction between the inner surface of the spherical guard F and the exterior surface of the pendular system contacting the same and sliding thereon is negligible so that it cannot cause deflection of the vertical axis $V_1V_2$ from its proper position, particularly since the oscillation period of the pendular system is several times greater than the periods of the disturbing oscillatory movements of the carrying means.

In any case, in order to considerably reduce the amplitude of the movements of the spherical guard F relative to the amplitudes of movements of the carrying means, the present invention proposes that the spherical guard F be a part of the structure of a second pendular system.

The second pendular system, as diagrammatically shown in FIG. 5, is illustrated only as a non-limitative example, and it includes a platform p, the spherical guard being rigidly connected therewith, the platform P being rigidly connected with a rod A which is substantially perpendicular to the plane of the platform P. The rod A passes through a hole Q of a face Z, being supported therein by a ball joint K, and has a suitable weight Y connected to its end.

Furthermore, the platform P is supported on the plane Z by means of three or more adjustable legs, each of the legs having a variable length.

The legs $X_1, X_2, .... X_n$ include cylinders $C_1, C_2, .... C_n$ rigidly connected at their top ends to the platform P. The cylinders are connected one to the other through suited pipes c and are hermetically sealed by pistons $E_1, E_2, .... E_n$, connected in their lower parts to stiff rods $a_1, a_2, .... a_n$ that are sliding with a minimum of friction on the carrying plane Z by their feet $p_1, p_2 .... p_n$. The chambers of the cylinders $C_1, C_2, .... C_n$ communicate one with the other via the pipes c, and they, as well as the pipes c, are filled with an exact total amount of fluid at a suitable pressure. FIG. 5 shows, among other things, a section, in the plane of the sheet, of the platform P, of the rod A, of a pair of the adjustable legs $X_1$ and $X_2$, as well as of the carrying plane Z, that is shown as being inclined relative to the horizon.

On the other hand, other legs that are symmetrical relative to the rod A and that are in the plane containing the said rod and orthogonal to the plane of the sheet, are not shown.

It is to be stated that the barycenter of all the masses, that compose the total compound pendular system, as described and shown in FIG. 5 must coincide, in its rest position, with the center of the ball joint K of the rod A.

It is evident that all the movements of the carrying plane Z, that is rigidly connected with the structure of the carrying means, are of two types: translatory movements in space and oscillatory movements. As the barycenter of the mass of the total pendular system substantially coincides with the center of the joint K, the masses that are below the carrying plane Z being counterbalanced by the masses above the plane, these masses also being acted upon by the pressure of the fluid in the interior of the cylinders $C_n$ and of the pipes c, the translatory movements of the carrying plane Z cannot compromise the verticality of the rod A.

On the contrary, as far as the oscillatory movements of the carrying plane Z are concerned, they only result in reciprocation of the pistons $E_1$, $E_2$, .... $E_n$ simultaneously with immediate transfer of the fluid among the cylinders $C_1$, $C_2$, .... $C_n$ and possibly in momentary changes of the specific pressure of the fluid. However, the pressures on the heads of the pistons will tend to immediately equalize, as a consequence of the Pascal's law. Therefore also the oscillatory movements in question can not have tangible consequences on the verticality of the rod A.

Finally, it is appropriate to point out that it is possible to regard the carrying means as absolutely still, it being thus possible to exactly determine the latitude and the longitude of the starting point, as well as to prearrange the described device in such a way that it is capable of indicating the respective values on the respective rings of the latitudes and of longitudes, so that then the three orthogonal axes of rotation of the gyroscopic system are prearranged in their respective correct requested directions and so that the action of the aforementioned clock-device can be commenced simultaneously with setting the gyroscopes in movement.

I claim:

1. A navigation device for use on a moving carrier, comprising gyroscopic means maintaining its position in the celestial space; support means mounting said gyroscopic means on said carrier with three degrees of freedom of movement with respect to the latter, and having an upright axis the position of which can deviate from a vertical position as a result of movement of said carrier; and means for maintaining said upright axis in said vertical position at any location on said carrier to thereby change the position of said support means with respect to said gyroscopic means whereby the extent of such change in position of said support means indicates the change in the position of said carrier with respect to the celestial space.

2. A device as defined in claim 1, wherein said gyroscopic means includes three pairs of gyroscopic masses, means for mounting each of said pairs of masses for rotation about an axis which is perpendicular to the axes of the other pairs of masses and intersects the same at a common point, and symmetrically with respect to said common point, and means for driving said masses into rotation about said axes to thereby maintain the position of said gyroscopic means in the celestian space.

3. A device as defined in claim 2, wherein one of said axes of said gyroscopic system parallels the terrestrial axis of rotation while the other two axes are located in a plane perpendicular to said one axis.

4. A device as defined in claim 1, wherein said gyroscopic means includes a latitude ring mounted on said support means for angular displacement with respect thereto in its own plane so that the extent of said angular displacement is indicative of the latitudinal position of said carrier.

5. A device as defined in claim 1, wherein said support means is mounted on said carrier for rotation about said upright axis so that the extent of rotation of said carrier is indicative of the longitudinal change in position of said carrier in the celestial space.

6. A device as defined in claim 1, wherein said maintaining means includes a pendular system.

7. A device as defined in claim 6, wherein the period of movement of said pendular movement greatly exceeds the periods of movement of said carrier tending to deviate said upright axis from said vertical position thereof.

8. A device as defined in claim 6, wherein said pendular system includes a pendulum having an axis coinciding with said upright axis of said support, a bearing mounting said pendulum on said carrier, a plurality of cylinder-and-piston units mounted on said pendulum and bearing against a surface rigid with said carrier, and means communicating said cylinder-and-piston units with one another so as to equalize pressures therein.

* * * * *